US008000115B2

(12) United States Patent
Polivka et al.

(10) Patent No.: US 8,000,115 B2
(45) Date of Patent: Aug. 16, 2011

(54) FLYBACK POWER SUPPLY WITH FORCED PRIMARY REGULATION

(75) Inventors: William M. Polivka, Campbell, CA (US); Raymond Kenneth Orr, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 12/968,100

(22) Filed: Dec. 14, 2010

(65) Prior Publication Data

US 2011/0085357 A1    Apr. 14, 2011

Related U.S. Application Data

(63) Continuation of application No. 12/341,353, filed on Dec. 22, 2008, now Pat. No. 7,876,583.

(51) Int. Cl.
*H02M 3/335* (2006.01)
(52) U.S. Cl. ................. 363/21.14; 363/21.16; 363/21.17
(58) Field of Classification Search ............... 363/21.14, 363/21.16, 21.15, 21.17
See application file for complete search history.

(56) References Cited

U.S. PATENT DOCUMENTS

| | | | |
|---|---|---|---|
| 4,996,638 | A | 2/1991 | Orr |
| 5,757,627 | A | 5/1998 | Faulk |
| 5,973,945 | A | 10/1999 | Balakrishnan et al. |
| 6,366,480 | B2 | 4/2002 | Hosotani et al. |
| 6,532,159 | B2 | 3/2003 | Nishida et al. |
| 7,518,885 | B2 * | 4/2009 | Baurle et al. .................... 363/16 |

OTHER PUBLICATIONS

"TOP221-227: TOPSwitch®-II Family—Three-terminal Off-line PWM Switch," Power Integrations, Inc., Revision D, Jul. 2001, pp. 1-20.
"TL431, TL431A, TL431B, TL432, TL432A, TL432B—Adjustable Precision Shunt Regulators," Texas Instruments Incorporated, Version SLVS543J, Aug. 2004, Revised Dec. 2005, pp. 1-65.
"DPA422-426: DPA-Switch® Family—Highly Integrated DC-DC converter ICs for Power over Ethernet & Telecom Applications," Power Integrations, Inc., Revision R, Feb. 2007, pp. 1-36.
"TOP252-262: TOPSwitch®-HX Family—Enhanced EcoSmart®, Integrated Off-line Switcher with Advanced Feature Set and Extended Power Range," Power Integrations, Inc., Revision E, Oct. 2008, pp. 1-48.

* cited by examiner

*Primary Examiner* — Shawn Riley
(74) *Attorney, Agent, or Firm* — Blakely Sokoloff Taylor & Zafman LLP

(57) ABSTRACT

A flyback converter controller with forced primary regulation is disclosed. An example flyback converter controller includes a secondary control circuit to be coupled to a switched element coupled to a second winding of a coupled inductor of a flyback converter. The secondary control circuit is to be coupled across an output of the second winding to switch the switched element in response to a difference between an actual output value at the output of the second winding and a desired output value to force a current in a third winding of the coupled inductor that is representative of the difference between the actual output value at the output of the second winding and the desired output value. A primary control circuit is also included and is to be coupled to a primary switch coupled to a first winding of the coupled inductor. The primary control circuit is to be coupled to receive the current forced in the third winding by the secondary control circuit. The primary control circuit is coupled to switch the primary switch to regulate an output of the flyback converter coupled to the output of the second winding in response to the forced current.

12 Claims, 9 Drawing Sheets

FLYBACK POWER SUPPLY WITH FORCED PRIMARY REGULATION

REFERENCE TO RELATED APPLICATION

The present application is a continuation of U.S. patent application Ser. No. 12/341,353, filed Dec. 22, 2008, now pending, entitled "FLYBACK POWER SUPPLY WITH FORCED PRIMARY REGULATION," hereby incorporated by reference.

BACKGROUND INFORMATION

1. Field of the Disclosure

The present invention relates generally to power supplies, and more specifically, the invention relates to ac-to-dc and/or dc-to-dc power supplies that use a flyback converter power conversion topology.

2. Background

In general, a flyback converter is a commonly used topology for low-cost power supplies meeting the requirements of mobile telephones and other portable electronic devices that use rechargeable batteries. In a typical application, the ac-dc power supply receives an input that is between 100 and 240 volts rms from an ordinary ac electrical outlet. Switches in the power supply are switched on and off by a control circuit to provide a regulated output that may be suitable for operating an electronic device, or for charging a battery that provides power to an electronic device. The output is typically a dc voltage less than 10 volts dc. Furthermore, the current from the output is usually regulated when the power supply is charging a battery.

Safety agencies generally require the power supply to provide galvanic isolation between input and output. Galvanic isolation prevents dc current from flowing between input and output of the power supply. In other words, a high dc voltage applied between an input terminal and an output terminal of the power supply will produce no dc current between the input terminal and the output terminal of the power supply. The requirement for galvanic isolation is a complication that contributes to the cost of the power supply.

A power supply with galvanic isolation must maintain an isolation barrier that electrically separates the input from the output. Energy must be transferred across the isolation barrier to provide power to the output, and information in the form of signals must be transferred across the isolation barrier to regulate the output. Galvanic isolation is typically achieved with electromagnetic and electro-optical devices. Electromagnetic devices such as transformers and coupled inductors are generally used to transfer energy between input and output to provide output power, whereas electro-optical devices are generally used to transfer signals between output and input to control the transfer of energy between input and output.

Efforts to reduce the cost of the power supply have focused on the elimination of electro-optical devices and their associated circuits. Alternative solutions generally use a single energy transfer element such as a transformer or coupled inductor to provide energy to the output and also to obtain the information necessary to control the output. The lowest cost configuration typically places the control circuit and a high voltage switch on the input side of the isolation barrier. The controller obtains information about the output indirectly from observation of a voltage at a winding of the energy transfer element. The winding that provides the information is also on the input side of the isolation barrier.

The input side of the isolation barrier is sometimes referred to as the primary side, and the output side of the isolation barrier is sometimes referred to as the secondary side. Windings of the energy transfer element that are not galvanically isolated from the primary side are also primary side windings, which are also sometimes called primary referenced windings. A winding on the primary side that is coupled to an input voltage and receives energy from the input voltage is sometimes referred to simply as the primary winding. Other primary referenced windings that deliver energy to circuits on the primary side may have names that describe their principal function, such as for example a bias winding, or for example a sense winding. Windings that are galvanically isolated from the primary side windings are secondary side windings, sometimes called output windings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples related to a power supply with forced primary regulation in accordance with the present invention are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples. Furthermore, the particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

One common method used in power supplies to obtain indirect information about the power supply output relies on a predictable relationship between a voltage at a primary winding and the status of the output of the power supply. A difficulty with this method is that the relationship between the voltage at the primary winding and the voltage at the output of the power supply is not precisely known. Although voltages on primary windings are approximately proportional to the output voltage of the power supply, many non-ideal effects cause the output voltage to change independently of the voltage on the primary winding.

As will be discussed, an improved method and apparatus are disclosed, which provide accurate regulation of the output of the power supply in accordance with the teachings of the present invention. In one example, a flyback power supply is discussed, which enables accurate regulation of an output of a flyback power supply that uses a single energy transfer element to provide galvanic isolation between the input and the output of the power supply in accordance with the teachings of the present invention.

Figure 1:
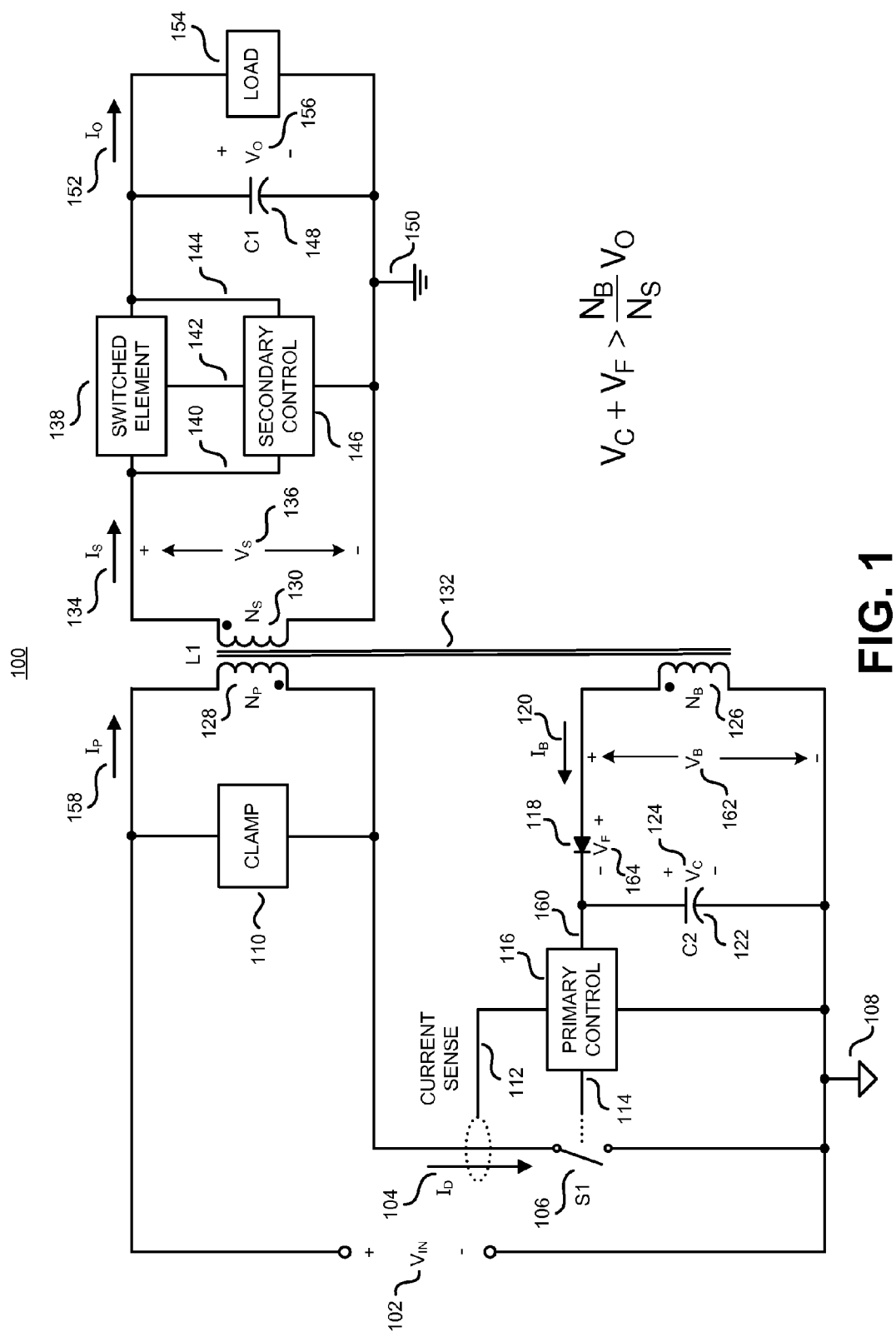
FIG. 1 is a schematic diagram of an example flyback power supply that shows the salient features of a power supply in accordance with the teachings of the present invention.

To illustrate, FIG. 1 shows generally a schematic of one example of a dc-dc power supply 100 that receives an input voltage $V_{IN}$ 102 to produce an output voltage $V_O$ 156 and an output current $I_O$ 152 at a load 154. In an example of an ac-dc power supply, the dc input voltage $V_{IN}$ 102 may be a rectified and filtered ac input voltage. Input voltage $V_{IN}$ 102 is positive with respect to an input return 108. Output voltage $V_O$ is positive with respect to an output return 150.

The example power supply 100 of FIG. 1 is a regulated flyback converter. As shown in the illustrated example, the flyback converter of power supply 100 includes energy transfer element L1 132 that is a coupled inductor with three windings. Energy transfer element L1 132 is sometimes referred to as a transformer because the voltages on its windings are related by the number of turns on each winding. Energy transfer element L1 132 has an input winding 128 with $N_P$ turns, an output winding 130 with $N_S$ turns, and a bias winding 126 with $N_B$ turns.

In the illustrated example, energy transfer element L1 132 provides galvanic isolation between circuits on the input of the power supply and circuits on the output of the power supply. That is, a dc voltage applied between input return 108 and output return 150 would cause no dc current to flow between input return 108 and output return 150. The isolation barrier that provides galvanic isolation is the electrical insulation between the windings. Input winding 128 and bias winding 126 are on the primary side of the isolation barrier. Output winding 130 is on the output side of the isolation barrier.

As shown in the depicted example, a switch S1 106 on the primary side of the isolation barrier opens and closes in response to a drive signal 114 from a primary control circuit 116. In one example, switch S1 106 may be a metal oxide semiconductor field effect transistor (MOSFET). In another example, switch S1 106 may be a bipolar junction transistor (BJT). In yet another example, switch S1 106 may be an insulated gate bipolar transistor (IGBT) or other suitable switch.

In one example, primary control circuit 116 generates drive signal 114 in response to a signal at a control terminal 160 to control the switching of switch S1 106. Primary control circuit 116 may also be responsive to a current sense signal 112 that indicates the value of current $I_D$ 104 in switch S1 106. Any of the several ways practiced in the art to sense current in a switch may provide the current sense signal 112.

In one example, primary control circuit 116 opens and closes switch S1 106 to regulate an output of power supply 100 to a desired value. The output may be a voltage, a current, or a combination of a voltage and a current. The example power supply 100 of FIG. 1 shows a regulated output voltage $V_O$ 156 at a load 154. Load 154 receives an output current $I_O$ 152.

An open switch cannot conduct current. A closed switch may conduct current. When switch S1 106 is closed, a primary current $I_P$ 158 enters primary winding 128 of coupled inductor L1 132, storing energy in the magnetic field of coupled inductor L1 132. There is no current in output winding 130 and in bias winding 126 when switch S1 106 is closed. A diode 118 coupled to bias winding 126 and a switched element 138 coupled to output winding 130 prevent current in the respective windings when switch S1 106 is closed.

When switch S1 106 opens, a current $I_s$ 135 may flow in output winding 130, and a current $I_B$ 120 may flow in bias winding 126. All or a portion of the energy stored in coupled inductor L1 132 may be released through windings 126 and 130 after switch S1 106 opens. That is, energy stored by primary current $I_P$ 158 in winding 128 when switch S1 106 is closed gets transferred to circuits that receive current $I_B$ 120 and current $I_S$ 134 from winding 126 and winding 130, respectively, when S1 106 is open. Currents $I_S$ 134 and $I_B$ 120 charge capacitors C1 148 and C2 122, respectively, to produce respective voltages $V_O$ 156 and $V_C$ 124. In the example of FIG. 1, capacitors C1 148 and C2 122 have sufficient capacitance such that voltages $V_O$ 156 and $V_C$ 124 are substantially dc voltages. In the example of FIG. 1, current $I_B$ 120 forward biases rectifier 118 to charge capacitor C2 122. In the example of FIG. 1, rectifier 118 has a forward voltage $V_F$ 164 when it conducts current $I_B$ 120.

In the illustrated example, the relationship between voltage $V_B$ 162 and voltage $V_S$ 136 is determined by the ratio of the number of turns on the respective windings 126 and 130. That is, $$\frac{V_B}{V_S} = \frac{N_B}{N_S} \quad (1)$$

In contrast to the fixed relationship between voltages $V_B$ 162 and $V_S$ 136, currents $I_B$ 120 and $I_S$ 134 in the respective windings, 126 and 130, are not related by the number of turns of the windings. Instead, currents $I_B$ 120 and $I_S$ 134 are determined separately by the properties of the circuits at each winding. That is, when switch S1 106 is open, currents $I_B$ 120 and $I_S$ 134 may be in any ratio. Either winding may have zero current at any time while switch S1 106 is open. When switch S1 106 is open, currents $I_B$ 120 and $I_S$ 134 are limited by the amount of energy remaining in the coupled inductor, but individual currents may take any value not exceeding that limit. Therefore, the stored energy may be directed as desired to either winding by forcing current with a control circuit at one of the windings in accordance with the teachings of the present invention.

As shown in the example illustrated in FIG. 1, power supply 100 includes a secondary control circuit 146 that operates a switched element 138 to portion the transfer of energy from the coupled inductor 132 to the output winding 130 and to the bias winding 126 in accordance with the teachings of the present invention. In the example, secondary control circuit 146 receives the voltage $V_S$ 136 at winding 130 as signal 140 and the output voltage $V_O$ 156 as signal 144. In the example, signals 140 and 144 conduct negligible current. Secondary control circuit 146 produces a drive signal 142 that switches the switched element 138 such that energy representative of the difference between the actual value of output voltage $V_O$ 156 and the desired value of output voltage $V_O$ 156 is diverted from output winding 130 to bias winding 126 in accordance with the teachings of the present invention. The desired value of output voltage $V_O$ 156 is specified for a particular power supply. The designer of the power supply typically sets the desired output voltage from a reference voltage established within secondary control 148, as will be discussed in detail later in this disclosure. The energy that represents the difference between the actual value of the output voltage $V_O$ 156 and the desired value of output voltage $V_O$ 156 may be considered to be an error signal.

The energy diverted to bias winding 126 is received by primary control circuit 116 as a signal that controls switch S1 106 such that output voltage $V_O$ 156 is regulated to the desired value. That is, the secondary control circuit 146 diverts energy representative of an error between actual and desired values of output voltage $V_O$ 156 to the bias winding 126. Primary control circuit 116 responds to the current $I_B$ 120 that contains information of the error signal. Primary control circuit 116 switches the switch 51 106 to regulate output voltage $V_O$ 156 to a desired value, thereby reducing the value of the error signal.

As shown in the example of FIG. 1 and described in detail later in this disclosure, voltage $V_C$ 124 on capacitor C2 122 is regulated by primary control circuit 116. Voltages and turns ratios are selected by the designer so that there will be current in bias winding 126 only when switched element 138 operates to divert energy to the bias winding 126. That is, $$V_C + V_F > \frac{N_B}{N_S} V_O \qquad (2)$$

A small fraction of the energy stored by primary current $I_P$ 158 in primary winding 128 cannot be transferred to other windings because the magnetic coupling between primary winding 128 and the other windings of the coupled inductor is not perfect. In the example power supply 100 of FIG. 1, energy that cannot be transferred to other windings is received by a clamp circuit 110, which limits the voltage across primary winding 128 to protect the switch S1 106 from damage by excessive voltage.

Figure 2A:
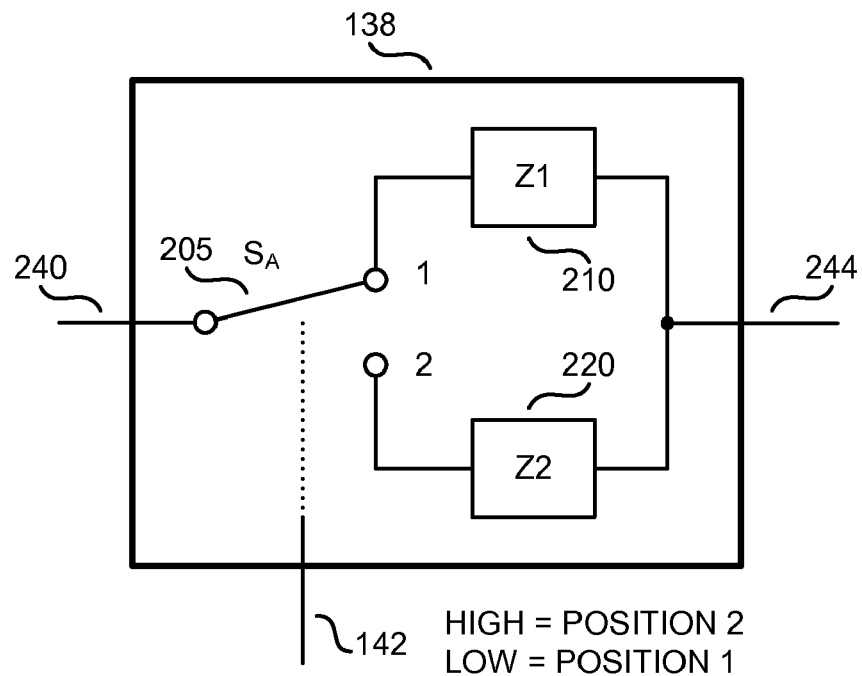
FIGS. 2A and 2B show functionally equivalent example representations of a switched element in accordance with the teachings of the present invention.
Figure 2B:
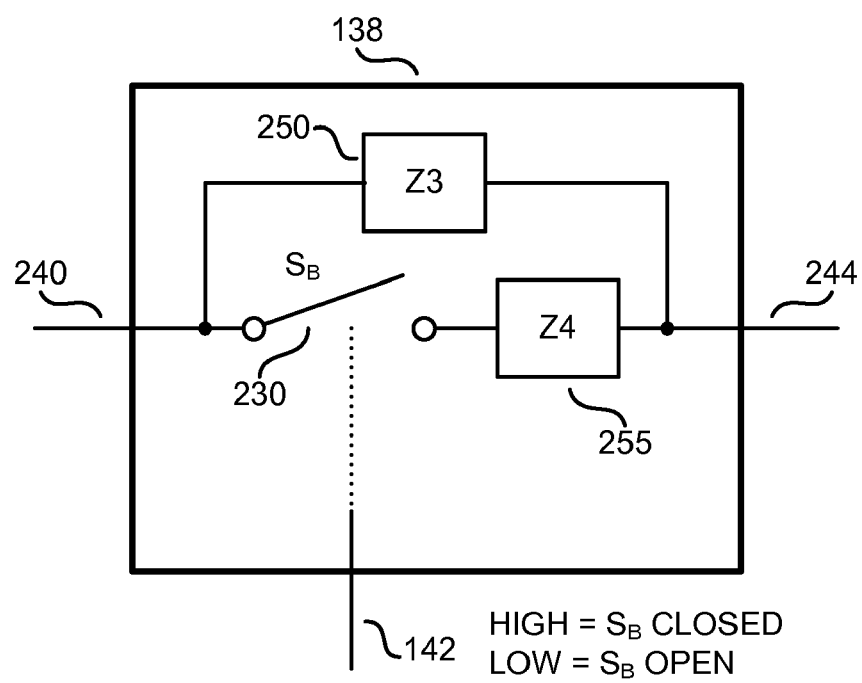

FIG. 2A and FIG. 2B show generally functionally equivalent examples of switched element 138 that may be used in the example power supply 100 of FIG. 1 in accordance with the teachings of the present invention. As will be discussed, switched element 138 is coupled to be switched to have an effective impedance between terminals 240 and 244 of either a first impedance or second impedance, where the first and second impedances are different. In one example, neither the first impedance nor the second impedance between terminals 240 and 244 is zero. In one example, the impedances may be nonlinear.

To illustrate, FIG. 2A shows a single pole double throw switch $S_A$ 205 that is controlled by drive signal 142 to be in either position 1 or position 2. When switch $S_A$ 205 is in position 1, current passing between terminal 240 and terminal 244 of switching element 138 must pass through impedance Z1 210. When switch $S_A$ is in position 2, current passing between terminal 240 and terminal 244 must pass through impedance Z2 220. In general, impedances Z1 210 and Z2 220 may be any value including zero and infinity, as long as impedances Z1 210 and Z2 220 are not the same. In the illustrated example, the impedance between terminal 240 and terminal 244 of switching element 138 must be different for high and low values of drive signal 142.

FIG. 2B illustrates an example switched element 138 that includes a single pole single throw switch $S_B$ 230 that is controlled by drive signal 142 to be either open or closed. FIG. 2B also includes impedances Z3 250 and Z4 255. The principal difference between the configurations of FIG. 2A and FIG. 2B is that impedance Z3 250 between terminal 240 and terminal 244 is not switched in the configuration of FIG. 2B. That is, impedance Z3 250 is between terminal 240 and terminal 244 when switch $S_B$ 230 is open and when switch $S_B$ is closed. When switch $S_B$ 230 is open, all current passing between terminal 240 and terminal 244 of switching element 138 must pass through impedance Z3 250. When switch $S_B$ is closed, a portion of the current passing between terminal 240 and terminal 244 may go through impedance Z3 250 and a portion of the current passing between terminal 240 and 244 may go through impedance Z4 255. In general, impedances Z3 250 and Z4 255 may be any value other than zero for Z3 250 and other than infinity for Z4 255, and they need not be different values.

In one example, any of the impedances Z1 210, Z2 220, Z3 250, and Z4 255 in FIG. 2A and FIG. 2B may be nonlinear. That is, the voltage across the impedance may not be directly proportional to the current through the impedance. For example, a pn junction diode may be considered to have nonlinear impedance. A Schottky diode may also be considered to have a nonlinear impedance.

In general, switched element 138 may be either bidirectional or unidirectional. A bidirectional switched element allows conduction of current in either direction. A unidirectional switched element allows conduction of current in only one direction. The switched elements of FIG. 2A and FIG. 2B may be unidirectional when impedances Z1 210, Z2 220, Z3 350, and Z4 255 include a diode.

Figure 3:
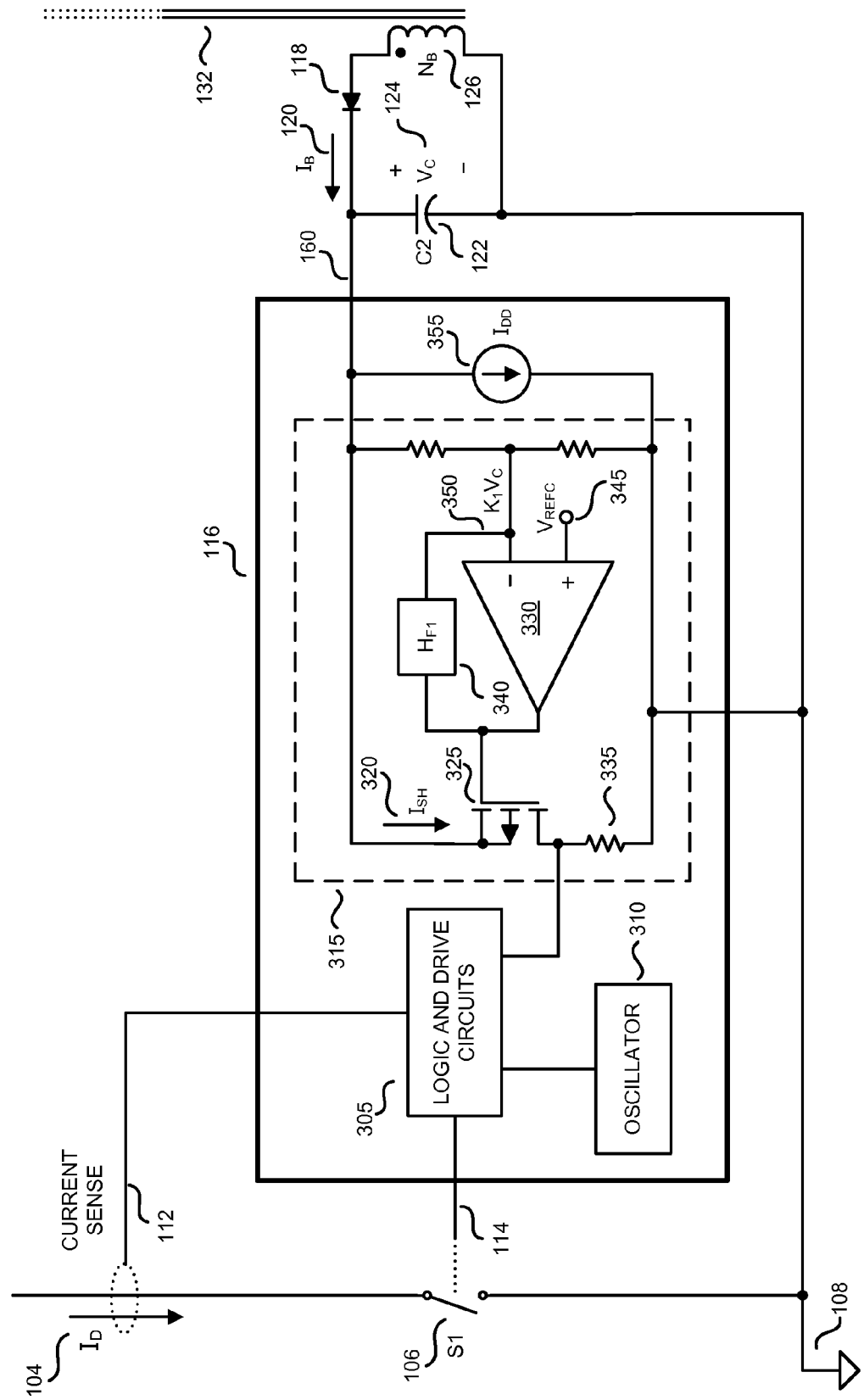
FIG. 3 is a portion of the flyback power supply of FIG. 1 showing more detail of an example primary control circuit in accordance with the teachings of the present invention.

FIG. 3 shows in greater detail an example primary control circuit 116 that may be used in example power supply 100 of FIG. 1. As shown, example primary control circuit 116 includes an oscillator 310 coupled to logic and drive circuits 305, which is coupled to a shunt regulator 315. In the illustrated example, primary control circuit 116 receives energy from bias winding 126 at control terminal 160. The energy from bias winding 126 provides power to operate control circuit 116. The energy from bias winding 126 also provides information about the difference between the actual value and the desired value of output voltage $V_O$ 156. That is, current $I_B$ 120 in bias winding 126 includes both a supply current for control circuit 116 as well as an error signal in accordance with the teachings of the present invention.

As shown in the example, current source 355 with value $I_{DD}$ represents the supply current required to operate primary control circuit 116, and may include current required to operate switch S1 106. In one example, primary control circuit 116 may be included in a monolithic integrated circuit. In another example, the integrated circuit may include primary control circuit 116, switch S1 114, and current sense signal 112. An example integrated circuit included in power supply 100 may be one of TOPSwitch or DPA-Switch family of products of Power Integrations, Inc. of San Jose, Calif.

Continuing with the example shown in FIG. 3, primary control circuit 116 includes a shunt regulator 315, which is coupled to regulate the control voltage $V_C$ 124 on capacitor C2 122 to a desired value. In operation of the power supply 100, energy directed to bias winding 126 is more than the amount necessary to provide power to primary control circuit 116. Energy that exceeds the amount necessary to power primary control circuit 116 is dissipated by shunt regulator 315 as a shunted current $I_{SH}$ 320.

When the control voltage $V_C$ 124 is regulated, shunted current $I_{SH}$ 320 is the difference between the average value of current $I_B$ 120 from bias winding 126 and current $I_{DD}$ from current source 355. In this way, shunt current $I_{SH}$ 320 is representative of the energy diverted to bias winding 126 in excess of the amount necessary to provide power to primary control circuit 116. Since the excess energy directed to bias winding 126 is representative of the error between the actual value and the desired value of the output, shunt current $I_{SH}$ 320 is representative of the error between the actual value and the desired value of the output. Thus, shunt current $I_{SH}$ 320 is an error current, and the average of current $I_B$ 120 in winding 126 is the sum of the error current $I_{SH}$ 320 and the supply current $I_{DD}$ 355.

As shown in the example shunt regulator 315 of FIG. 3, an amplifier 330 with an optional feedback circuit $H_{F1}$ 340 receives a fraction $K_1$ of the desired control voltage $V_C$ 124 at an inverting input terminal 350 of amplifier 330. Amplifier 330 receives a reference voltage $V_{REFC}$ at a noninverting input terminal 345. The output of amplifier 330 drives a p-channel MOSFET 325 to conduct shunt current $I_{SH}$ 320 such that the voltage $K_1 V_C$ at inverting input terminal 350 is substantially the same as the reference voltage $V_{REFC}$ at non-inverting input terminal 345. Thus, the control voltage $V_C$ 124 is regulated to the value $V_{REFC}$ divided by the fraction $K_1$.

In the example shunt regulator 315, shunt current $I_{SH}$ 320 is converted to an error voltage by a resistor 335. Logic and drive circuits 305 receive the error voltage from resistor 335, timing signals from an oscillator 310, and current sense signal 112 to produce drive signal 114 that is coupled to control the switching of switch S1 106.

Figure 4:
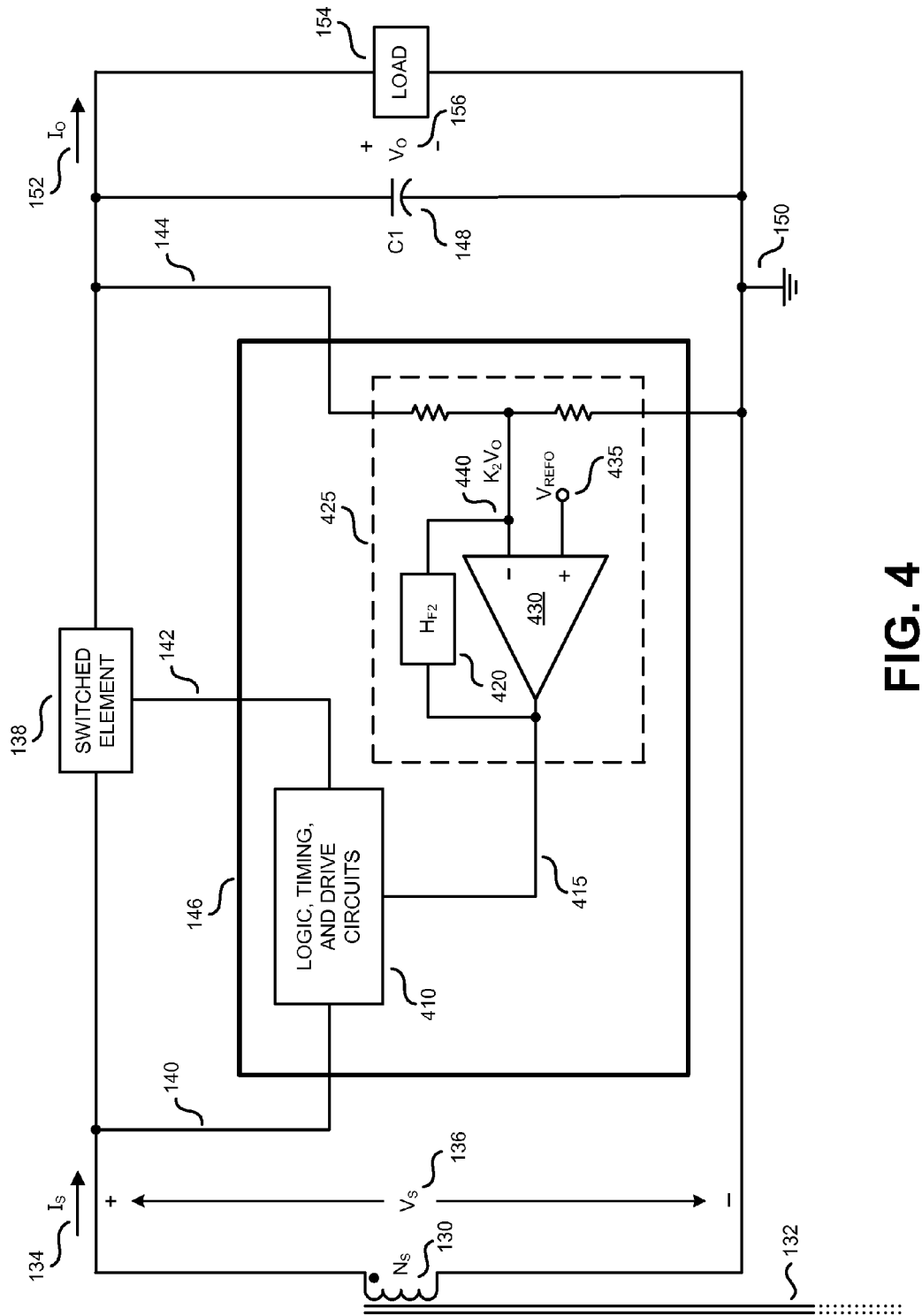
FIG. 4 is a portion of the flyback power supply of FIG. 1 showing more detail of an example secondary control circuit in accordance with the teachings of the present invention.

FIG. 4 shows in greater detail an example secondary control circuit 146. Secondary control circuit 146 includes a secondary error amplifier 425 that provides a secondary error signal 415. In one example, logic, timing, and drive circuits 410 receives secondary error signal 415 and voltage $V_S$ 136 to produce drive signal 142 for switched element 138.

As shown in the example of FIG. 4, secondary error amplifier 425 includes an operational amplifier 430 with optional feedback network $H_{F2}$ 420. An inverting input terminal 440 is coupled to receive a fraction $K_2$ of the output voltage $V_O$ 156. Amplifier 430 receives a reference voltage $V_{REFO}$ at a noninverting input terminal 435. In the example, the desired output voltage is the reference voltage $V_{REFO}$ divided by $K_2$. The output of amplifier 430 is received by logic, timing, and drive circuits 410, which is coupled to operate switched element 138 to produce current $I_B$ 120 at bias winding 126 such that voltage $K_2 V_O$ at inverting input terminal 440 is substantially the same as the reference voltage $V_{REFO}$ at noninverting input terminal 435. Thus, the output voltage $V_O$ 156 is regulated to the value $V_{REFO}$ divided by the fraction $K_2$.

Figure 5:
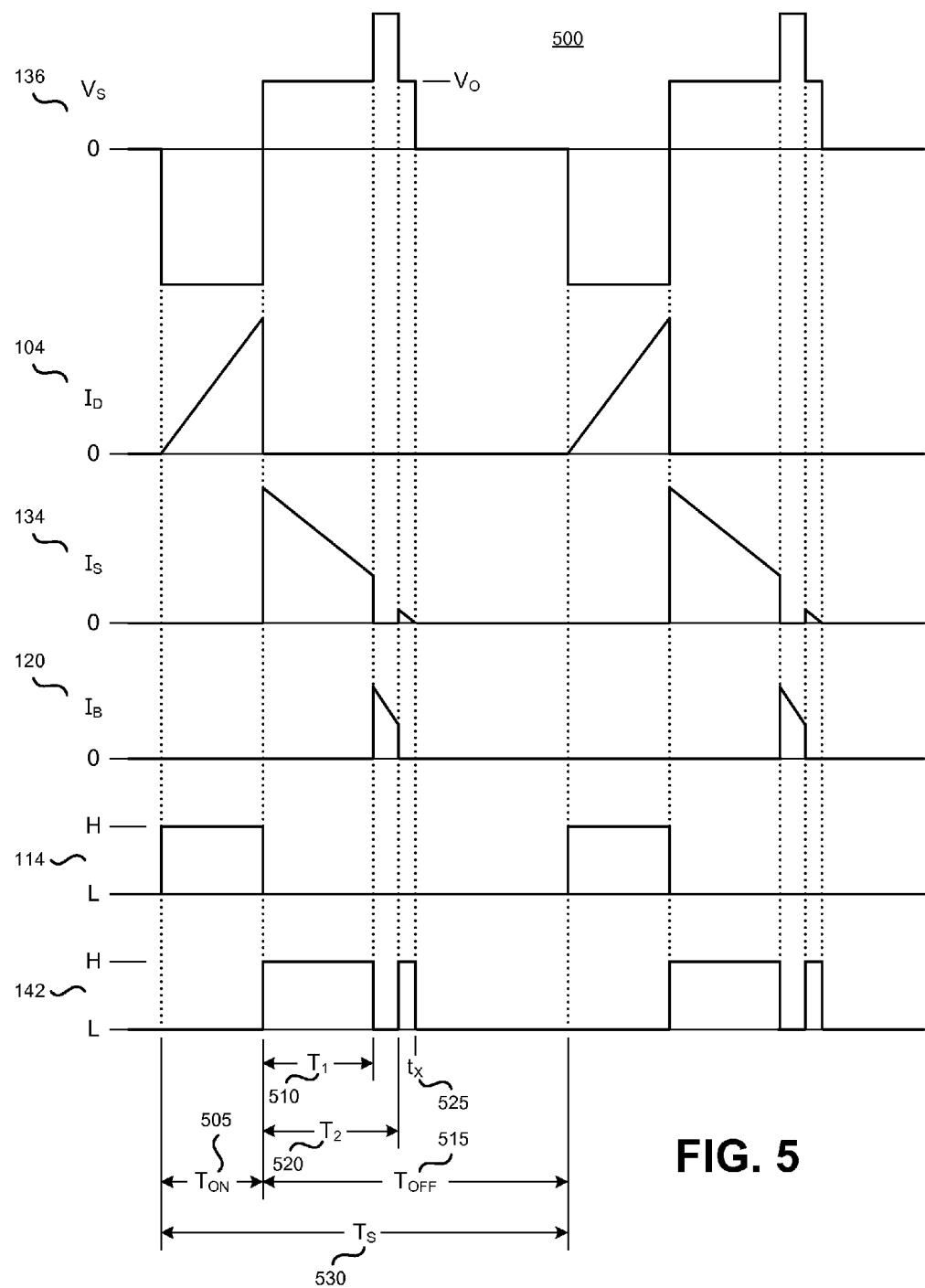
FIG. 5 is a timing diagram that shows example waveforms from the power supply of FIG. 1 when it operates in discontinuous conduction mode in accordance with the teachings of the present invention.

FIG. 5 is a timing diagram 500 that shows waveforms illustrating operation of example power supply 100 in FIG. 1 when it operates in discontinuous conduction mode (DCM). When the power supply 100 in FIG. 1 operates in DCM, all the energy in coupled inductor L1 132 is removed from inductor L1 132 during the time that switch S1 106 is open. That is, when switch S1 106 is initially closed, there is no remaining energy stored in coupled inductor L1 132. When the power supply 100 in FIG. 1 operates in DCM, the current $I_D$ 104 in switch S1 106 has a value of zero immediately after switch S1 106 closes.

The waveforms in the timing diagram 500 of FIG. 5 show operation of the power supply 100 of FIG. 1 when switched element 138 has characteristics of FIG. 2A and FIG. 2B with impedances Z1 210 and Z3 250 infinite, and impedances Z2 220 and Z4 255 zero. That is, switched element 138 conducts current $I_S$ 134 when drive signal 142 is high, and switched element 138 does not conduct current when drive signal 142 is low.

FIG. 5 shows a complete switching period $T_S$ 530. Drive signal 114 from primary control circuit 116 is high for a duration $T_{ON}$ 505, allowing switch S1 106 to conduct current $I_D$ 104. Drive signal 114 is low for a duration $T_{OFF}$ 515, preventing switch S1 106 from conducting. Drive signal 142 from secondary control circuit 146 is high for a duration $T_1$ 510 after the end of $T_{ON}$ 505, allowing switched element 138 to conduct current $I_S$ 134 in secondary winding 130. Drive signal 142 from secondary control circuit 138 goes low at the end of $T_1$ 510, preventing switched element 138 from conducting current.

In the example of FIG. 5, bias current $I_B$ 120 is zero while switched element 138 conducts current $I_S$ 134 from secondary winding 130 because diode 118 is reverse biased. That is, when switched element 138 conducts, the voltage $V_B$ 162 on bias winding 126 is less than the sum of control voltage $V_C$ 124 plus forward voltage $V_F$ 164.

When drive signal 142 goes low at the end of T±510 to reduce current $I_S$ 134 in secondary winding 130, the stored energy in coupled inductor L1 132 forces current $I_B$ 120 in bias winding 126, causing secondary voltage $V_S$ 136 to be greater than output voltage $V_O$ 156. Drive signal 142 remains low until a duration $T_2$ 520 after the end of $T_{ON}$ 505. Drive signal 142 goes high at the end of time $T_2$ 520, allowing switched element 138 to again conduct current $I_S$ 134 from secondary winding 130, reducing secondary voltage $V_S$ 136 to output voltage $V_O$ 156, and preventing conduction of current $I_B$ 120 in bias winding 126. Switched element 138 stops conducting at time $t_x$ 525 after all the energy is removed from coupled inductor L1 132. Therefore, drive signal 142 from secondary control circuit 146 goes low for at least a portion of the off time $T_{OFF}$ 515, which causes switched element 138 to reduce current $I_S$ 134 from secondary winding 130, which forces current $I_B$ 120 in bias winding 126 in accordance with the teachings of the present invention. In one example, the secondary control circuit 146 is coupled to cause switched element 138 to reduce current $I_S$ 134 from secondary winding 130 in response to a difference between a desired output value and an actual output value of the power converter in accordance with the teachings of the present invention.

In the example of FIG. 5, drive signal 142 from secondary control 146 goes low at time $t_x$ 525 when all the stored energy is removed from coupled inductor L1 132. Drive signal 142 from secondary control 146 need not go to zero when there is no more stored energy in coupled inductor L1 132 if switched element 138 is a unidirectional switched element.

Figure 6:
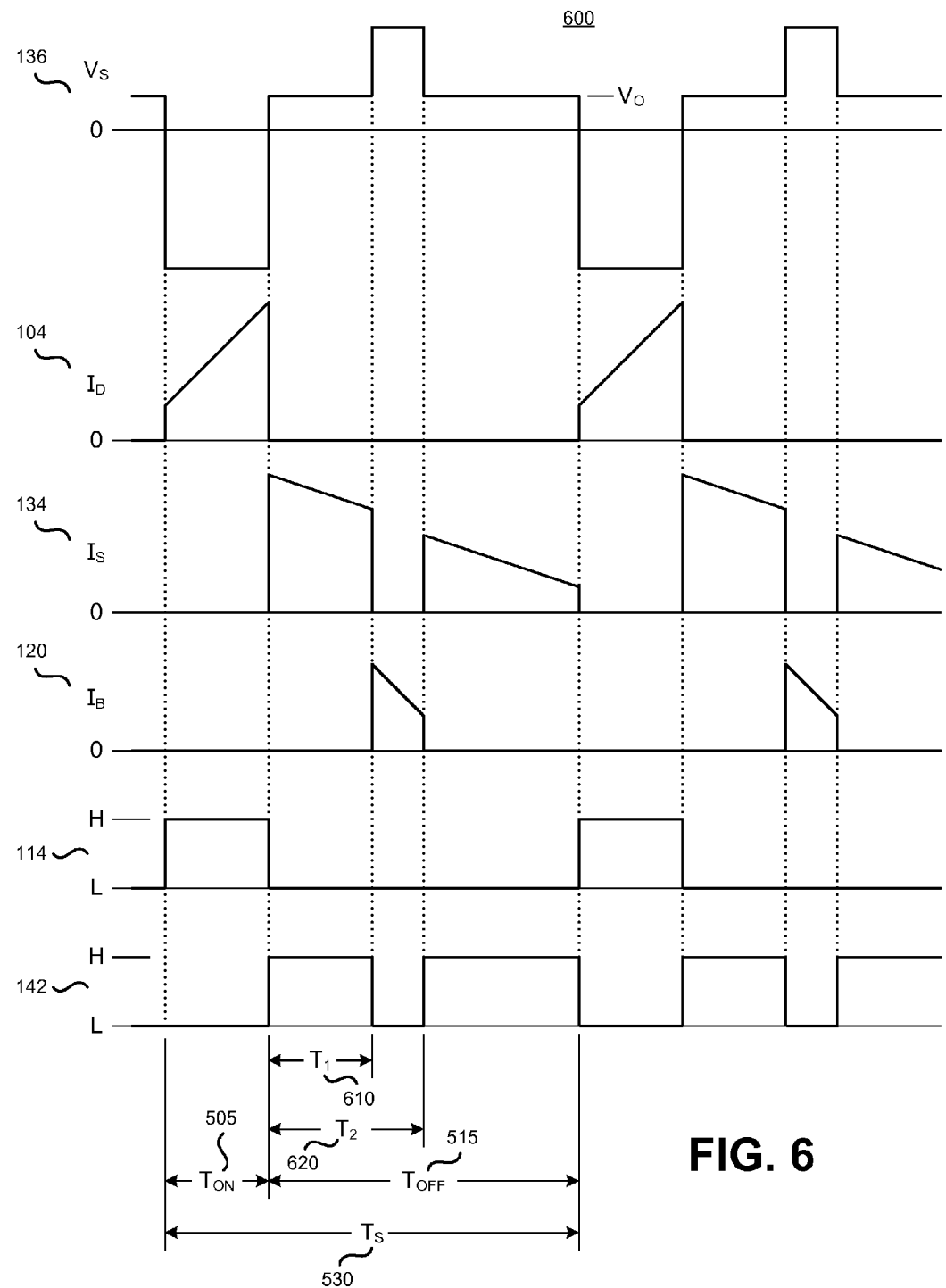
FIG. 6 is a timing diagram that shows example waveforms from the power supply of FIG. 1 when it operates in continuous conduction mode in accordance with the teachings of the present invention.

FIG. 6 is a timing diagram 600 that shows waveforms illustrating operation of the power supply 100 in FIG. 1 when it operates in continuous conduction mode (CCM). When the power supply 100 in FIG. 1 operates in CCM, there is energy in coupled inductor L1 132 during the entire time that switch S1 106 is open. That is, there is energy in coupled inductor L1 132 when switch S1 106 initially closes. When the power supply 100 in FIG. 1 operates in CCM, the current $I_D$ 104 in switch S1 106 has a value greater than zero immediately after switch S1 106 closes.

Similar to the operation in DCM illustrated in FIG. 5, FIG. 6 shows that in CCM, drive signal 142 goes high for duration $T_1$ 610 after switch S1 106 opens, allowing switched element 138 to conduct current $I_S$ 134. At the end of $T_1$ 610, switched element 138 opens to reduce current $I_S$ 134, forcing current $I_B$ 120 in bias winding 126. Switched element 138 closes to allow $I_S$ 134 to conduct after duration $T_2$ 620 from the time switch S1 106 opens. Therefore, drive signal 142 from secondary control circuit 146 goes low for at least a portion of the off time $T_{OFF}$ 515, which causes switched element 138 to reduce current $I_S$ 134 from secondary winding 130, which forces current $I_B$ 120 in bias winding 126 in accordance with the teachings of the present invention. In one example, the secondary control circuit 146 is coupled to cause switched element 138 to reduce current $I_S$ 134 from secondary winding 130 in response to a difference between a desired output value and an actual output value of the power converter in accordance with the teachings of the present invention.

Other example power supplies that benefit from the teachings of the present invention may operate with timing diagrams that are modified from diagram 500 of FIG. 5 and diagram 600 of FIG. 6. For operation in either DCM or CCM, switched element 138 may either reduce or prevent conduction of current $I_S$ 134 at any time while switch S1 106 is open. That is, the time when switched element 138 opens after switch S1 106 opens may be closer to the beginning of $T_{OFF}$ 515 or closer to the end of $T_{OFF}$ 515. Switched element 138 may either reduce or prevent conduction of current $I_S$ 134 multiple times while switch S1 106 is open. Secondary controller 146 may open and close switched element 138 as many times as necessary during $T_{OFF}$ to force sufficient current $I_B$ in bias winding 126 to regulate the output.

Figure 7:
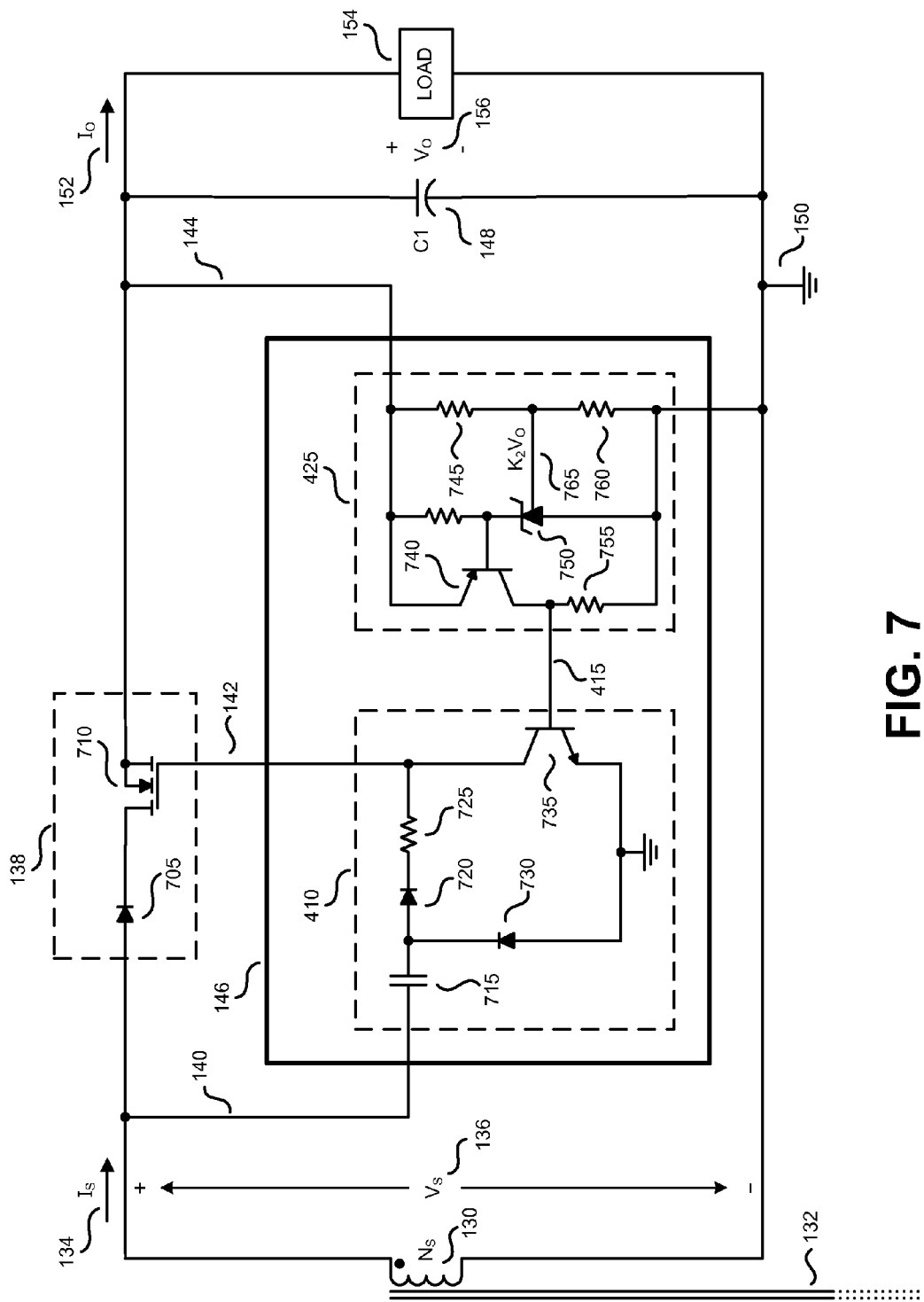
FIG. 7 is a schematic diagram that shows an example switched element and an example secondary control circuit for the flyback power supply of FIG. 1 in accordance with the teachings of the present invention.

FIG. 7 shows details of an example secondary control circuit 146 with an example switched element 138 for the power supply 100 of FIG. 1. In the example shown in FIG. 7, switched element 138 is a unidirectional switched element that includes a diode 705 and an n-channel MOSFET 710. Secondary error amplifier 425 includes a three terminal shunt regulator 750, which in one example may be a TL431 regulator or the like. The TL431 regulator is a common three-terminal integrated circuit that includes an internal reference voltage. When an external voltage applied to a reference terminal exceeds the reference voltage, the TL431 conducts current at its other two terminals. Resistors 745 and 760 are coupled to form a voltage divider to provide a fraction $K_2$ of output voltage $V_O$ 156 to the reference terminal 765 of the shunt regulator 750. In the example, the desired output voltage is the reference voltage of the TL431 divided by $K_2$. Secondary error signal 415 is a voltage developed on a resistor 755 by the current from pnp transistor 740.

As shown in the depicted example, logic, timing, and drive circuits 410 includes a capacitor 715 coupled to a charging diode 730 and a discharging diode 720, which is coupled to a resistor 725, which is coupled to a npn transistor 735. Capacitor 715, charging diode 730, and discharging diode 720 form a charge pump that provides drive signal 142 to the gate of n-channel MOSFET 710, which is part of unidirectional switched element 138.

In operation, capacitor 715 charges when secondary voltage $V_S$ 136 goes negative during the interval $T_{ON}$ 505. When secondary voltage $V_S$ 136 goes positive, capacitor 715 discharges through diode 720, resistor 725, and npn transistor 735. When secondary voltage $V_S$ 136 goes from negative to positive, there is sufficient voltage on drive signal 142 to cause n-channel MOSFET 710 to conduct. Switched element 138 conducts secondary current $I_S$ 134 until npn transistor 735 discharges capacitor 715 sufficiently to lower the voltage on drive signal 142 to cause n-channel MOSFET 710 to stop conducting. In the example of FIG. 7, switched element 138 conducts only once in a switching period. In the example of FIG. 7, a larger secondary error signal 415 causes npn transistor 735 to discharge capacitor 715 faster, which causes switched element 138 to stop conducting earlier in the switching period $T_s$ 530 after switch S1 106 opens.

Figure 8:
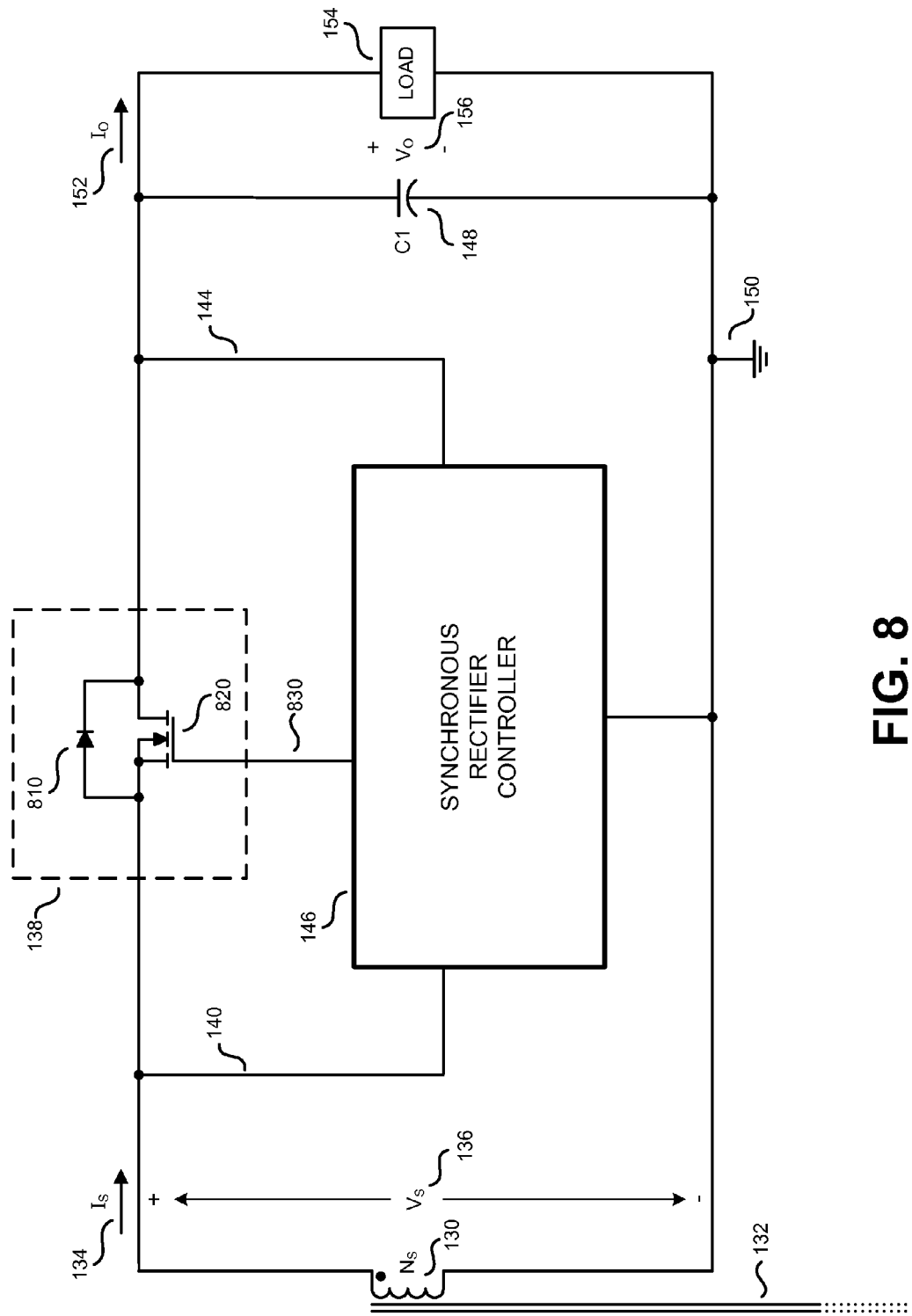
FIG. 8 is a schematic diagram that shows an example of another switched element with another secondary control circuit for the flyback power supply of FIG. 1 in accordance with the teachings of the present invention.

FIG. 8 shows an example of another switched element with another secondary control circuit, where the switched element 138 is a synchronous rectifier that includes an n-channel MOSFET 820 and a parallel diode 810. A synchronous rectifier is sometimes used instead of a diode in the output winding of a switching power supply because the voltage across a MOSFET can be significantly less than the voltage across a diode when conducting current. The lower voltage of the synchronous rectifier raises efficiency by dissipating less power than the diode. In one example, parallel diode 810 represents an internal body diode of n-channel MOSFET 820. In one example, parallel diode 810 is a discrete diode that may be a Schottky diode.

In the example of FIG. 8, the secondary control circuit 146 is a synchronous rectifier controller. Secondary control circuit 146 provides a drive signal 830 to the gate of n-channel MOSFET 820. In contrast to the switched element 138 in the example of FIG. 7, which can prevent conduction of secondary current $I_S$ 134 by inserting a very high impedance between secondary winding 130 and output 156, the switched element 138 in the example of FIG. 8 reduces secondary current $I_S$ 134 by changing the impedance of switched element 138 between two low values. When drive signal 830 is low, switched element 138 has the impedance of diode 810. When drive signal 830 is high, switched element 138 has the lower impedance of MOSFET 820. The insertion of the higher impedance of diode 810 reduces secondary current $I_S$ 134 while increasing current $I_B$ 120 in bias winding 126.

Figure 9:
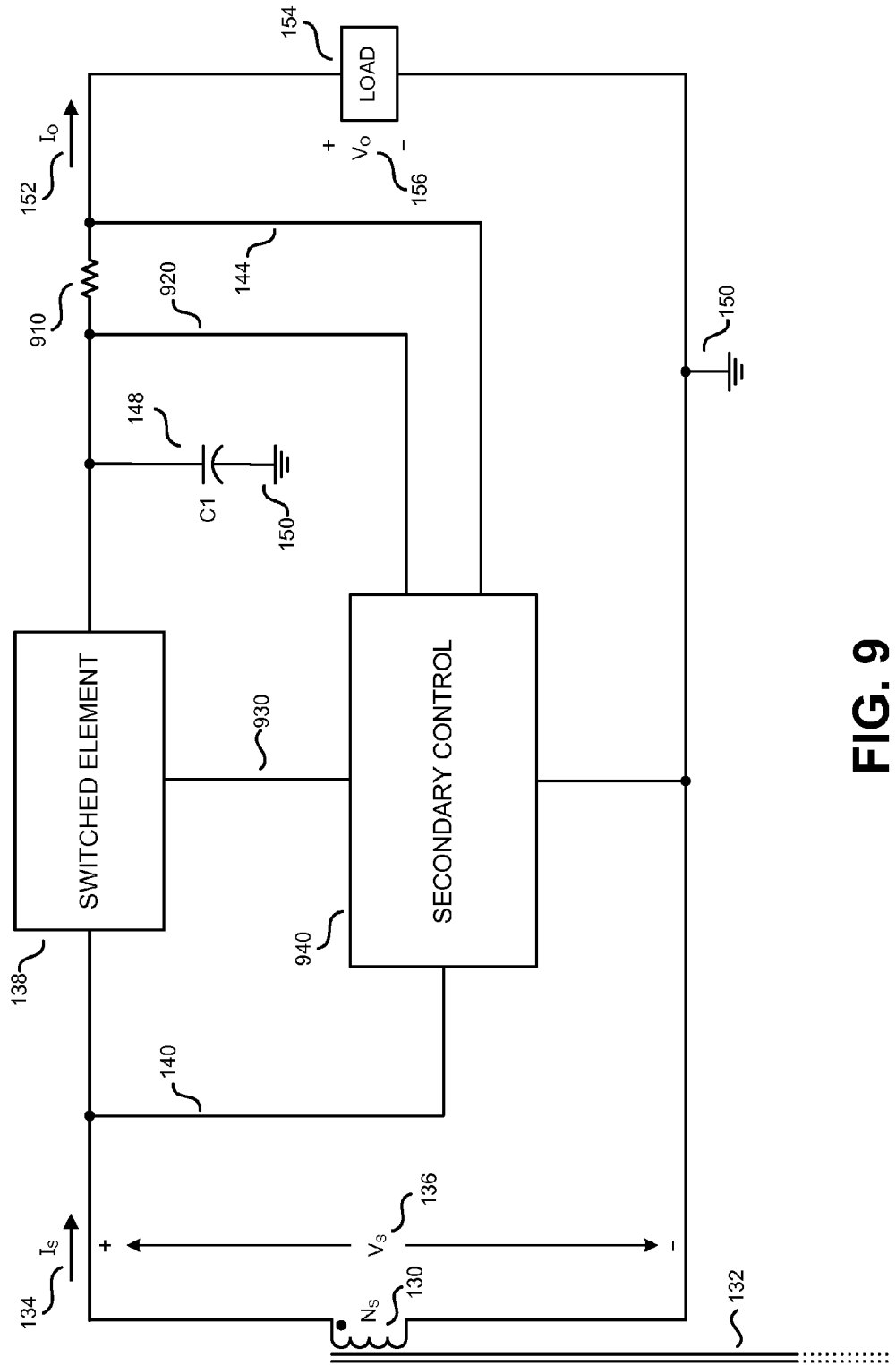
FIG. 9 shows an example of a portion of a flyback power supply that uses a switched element with a secondary control circuit to regulate an output voltage and an output current of a flyback power supply in accordance with the teachings of the present invention.

FIG. 9 shows an example of a portion of a flyback power supply where secondary control circuit 940 controls output current $I_O$ 152 and output voltage $V_O$ 156 with a drive signal 930 coupled to control switched element 138. In the example, secondary control circuit 940 senses output voltage $V_O$ 156 as signal 144 and senses output current $I_O$ 152 as signal 920 at current sense resistor 910. In the example of FIG. 9, the voltage across current sense resistor 910 is the difference between signal 920 and signal 144. Thus, FIG. 9 shows how example teachings of the present invention may be adapted to control an output that is a voltage, or an output that is a current, or an output that is a combination of a voltage and a current in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A flyback converter controller, comprising:
   a secondary control circuit to be coupled to a switched element coupled to a second winding of a coupled inductor of a flyback converter, the secondary control circuit to be coupled across an output of the second winding to switch the switched element in response to a difference between an actual output value at the output of the second winding and a desired output value to force a current in a third winding of the coupled inductor that is representative of the difference between the actual output value at the output of the second winding and the desired output value; and
   a primary control circuit to be coupled to a primary switch coupled to a first winding of the coupled inductor, the primary control circuit to be coupled to receive the current forced in the third winding by the secondary control circuit, the primary control circuit coupled to switch the primary switch to regulate an output of the flyback converter coupled to the output of the second winding in response to the forced current.

2. The flyback converter controller of claim 1 wherein the second winding of the coupled inductor is galvanically isolated from the first and third windings.

3. The flyback converter controller of claim 1 wherein the switched element is coupled to be switched to have a first impedance or a second impedance, wherein the first and second impedances are not equal.

4. The flyback converter controller of claim 3 wherein the first impedance is substantially zero and the second impedance is substantially infinite.

5. The flyback converter controller of claim 1 wherein the switched element is unidirectional.

6. The flyback converter controller of claim 1 wherein the switched element is bidirectional.

7. The flyback converter controller of claim 1 wherein the primary control circuit comprises a shunt regulator coupled to receive the current forced in the third winding by the secondary control circuit to extract an error signal from the forced current, wherein the primary control circuit is coupled to switch the primary switch in response to the error signal.

8. The flyback converter controller of claim 1 wherein the secondary control circuit comprises a secondary error amplifier coupled to a voltage divider coupled across the output of the second winding and a reference voltage to determine the difference between the actual output value at the output of the second winding and the desired output value.

9. The flyback converter controller of claim 1 wherein the secondary control circuit comprises a shunt regulator coupled to a voltage divider coupled across the output of the second winding, the shunt regulator having an internal reference voltage, the shunt regulator coupled to determine the difference between the actual output value at the output of the second winding and the desired output value.

10. The flyback converter controller of claim 1 wherein the switched element comprises a synchronous rectifier coupled to the second winding.

11. The flyback converter controller of claim 1 wherein the secondary control circuit is coupled to control an output current and an output voltage of the flyback converter with a drive signal coupled to the switched element.

12. The flyback converter controller of claim 1 wherein the secondary control circuit is coupled to cause the switched element to reduce a current from the second winding during a portion of an off time of the primary switch to force the current in the third winding.

* * * * *